(12) United States Patent
Tsurumi

(10) Patent No.: US 12,090,652 B2
(45) Date of Patent: Sep. 17, 2024

(54) INFORMATION PROCESSING APPARATUS, INFORMATION PROCESSING METHOD AND COMPUTER PROGRAM

(71) Applicant: SONY CORPORATION, Tokyo (JP)

(72) Inventor: Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 791 days.

(21) Appl. No.: 17/281,515

(22) PCT Filed: Jul. 26, 2019

(86) PCT No.: PCT/JP2019/029330
§ 371 (c)(1),
(2) Date: Mar. 30, 2021

(87) PCT Pub. No.: WO2020/075368
PCT Pub. Date: Apr. 16, 2020

(65) Prior Publication Data
US 2022/0040844 A1   Feb. 10, 2022

(30) Foreign Application Priority Data

Oct. 9, 2018  (JP) .................................. 2018-190789

(51) Int. Cl.
*B25J 9/00* (2006.01)
*B25J 9/16* (2006.01)
*B25J 11/00* (2006.01)
*G06N 20/00* (2019.01)

(52) U.S. Cl.
CPC ............. *B25J 9/0003* (2013.01); *B25J 9/163* (2013.01); *B25J 9/1661* (2013.01); *B25J 11/008* (2013.01); *G06N 20/00* (2019.01); *G05B 2219/40411* (2013.01)

(58) Field of Classification Search
CPC ........ B25J 11/008; B25J 9/0003; B25J 9/163; B25J 9/1661; G05B 2219/32009; G05B 2219/40411; G06N 20/00
See application file for complete search history.

(56) References Cited

U.S. PATENT DOCUMENTS

2019/0291277 A1* 9/2019 Oleynik ................. B25J 9/1669

FOREIGN PATENT DOCUMENTS

| JP | 2009-297880 A | 12/2009 |
|---|---|---|
| JP | 2017-024113 A | 2/2017 |
| JP | 2017-039170 A | 2/2017 |
| WO | WO 2009/001550 A1 | 12/2008 |

* cited by examiner

*Primary Examiner* — Jaime Figueroa
*Assistant Examiner* — Zachary Joseph Wallace
(74) *Attorney, Agent, or Firm* — Paratus Law Group, PLLC

(57) ABSTRACT

An information processing apparatus (3) according to an embodiment includes: a context analysis unit (310) that analyzes at least one or more contexts of a user (2), an environment, or a robot (1) based on acquired information; a work plan generation unit (330) that determines, regarding work executed by the user and the robot in cooperation, for each of steps of the work, whether to have the user or the robot execute the step, based on the context, and generates a work plan of the work; and a step determination unit (340) that determines the steps to be executed by the user and the steps to be executed by the robot, based on the work plan.

14 Claims, 6 Drawing Sheets

FIG.3

| PERIODICITY | EVENT OF USER | STATE OF USER | STATE OF ROBOT |
|---|---|---|---|
| SEASON | HAD PARTY YESTERDAY | PHYSICAL CONDITION | END EFFECTOR IS CHANGED |
| DAY OF WEEK | LEAVE FOR WORK EARLY TODAY | HAVE INJURED FINGER | ARM IS REPAIRED |
| TIME | HAVE GUEST TODAY | FATIGUE STATE | ... |
| WEATHER | GET NEW KNIFE | ... | ... |
| ... | BUY PLATE | ... | ... |

FIG.4

| STEPS | WORK PLAN 1 | WORK PLAN 2 | WORK PLAN 3 |
|---|---|---|---|
| 1. PREPARE INGREDIENTS | ROBOT | USER | ROBOT |
| 2. PREPARE UTENSILS | ROBOT | USER | ROBOT |
| 3. CRACK EGGS INTO BOWL | ROBOT | USER | ROBOT |
| 4. SPRINKLE SALT | ROBOT | ROBOT | USER |
| 5. STIR WITH CHOPSTICKS | ROBOT | ROBOT | ROBOT |
| 6. HEAT FRYING PAN AND PUT OIL | ROBOT | ROBOT | ROBOT |
| 7. PUT EGGS INTO FRYING PAN | ROBOT | ROBOT | ROBOT |
| 8. ROLL EGGS | ROBOT | ROBOT | ROBOT |
| 9. TAKE OUT AND PLACE OMELET ON CUTTING BOARD | ROBOT | ROBOT | ROBOT |
| 10. CUT OMELET | ROBOT | ROBOT | USER |
| 11. PLACE OMELET ON PLATE | ROBOT | USER | USER |
| TIME | 20 MIN. | 10 MIN. | 22 MIN. |
| FATIGUE | 0 | 20 | 15 |
| COMMITMENT TO TASTE | 0 | 0 | 60 |
| COMMITMENT TO WAY OF SERVING | 0 | 0 | 80 |
| NEW EXPERIENCE | 0 | 0 | 30 |

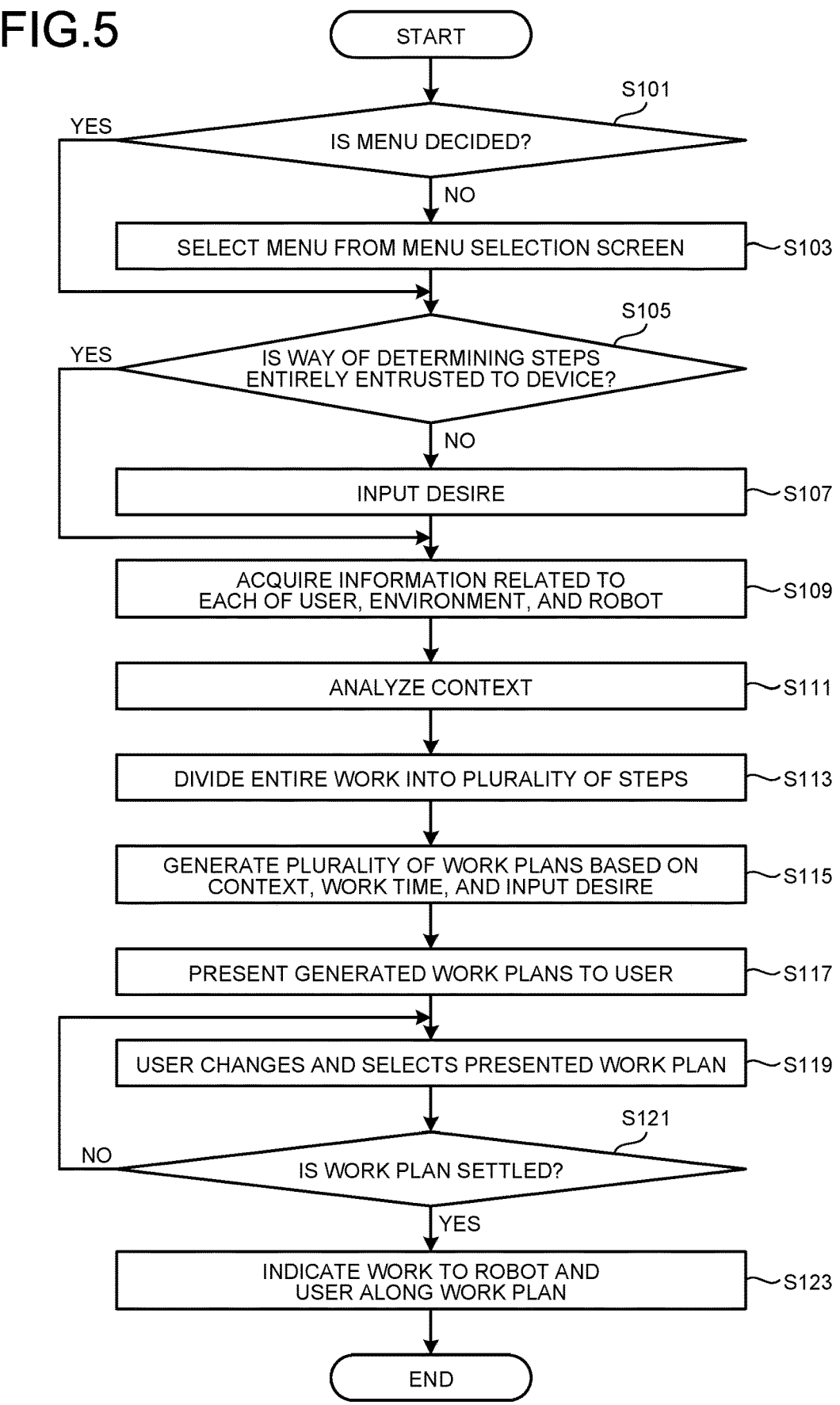

INFORMATION PROCESSING APPARATUS, INFORMATION PROCESSING METHOD AND COMPUTER PROGRAM

CROSS REFERENCE TO PRIOR APPLICATION

This application is a National Stage Patent Application of PCT International Patent Application No. PCT/JP2019/029330 (filed on Jul. 26, 2019) under 35 U.S.C. § 371, which claims priority to Japanese Patent Application No. 2018-190789 (filed on Oct. 9, 2018), which are all hereby incorporated by reference in their entirety.

FIELD

The present disclosure relates to an information processing apparatus, an information processing method, and a computer program.

BACKGROUND

Recently, robots are expanding its work fields not only in production sites and the like such as factories but also in public facilities, living spaces, or the like. Therefore, there are more and more occasions for robots and humans (users) to execute work in cooperation.

For example, the following Patent Literature 1 discloses a device that calculates cycle time of a robot by simulating actions of the robot in a production system in which the robot and humans perform assembly and the like of components in cooperation. The device disclosed in Patent Literature 1 is targeted at working robots used in factories and the like. Therefore, it is an object of the device disclosed in Patent Literature 1 to execute the work efficiently by assigning each step of the work to either the robots or humans based on weight of target components, transporting distance, and required time.

CITATION LIST

Patent Literature

Patent Literature 1: Japanese Patent Application Laid-open No. 2017-24113

SUMMARY

Technical Problem

In the meantime, robots used in public facilities, living spaces, or the like are desired to execute work in cooperation with users under various states. Therefore, such robots are required to execute the work according to various states (also referred to as contexts).

Thus, the present disclosure proposes new and improved information processing apparatus, information processing method, and computer program capable of properly determining each step of the work to be executed by a robot or a user based on a context in regards to the work executed by the robot and the user in cooperation.

Solution to Problem

For solving the problem described above, an information processing apparatus according to one aspect of the present disclosure has a context analysis unit that analyzes at least one or more contexts of a user, an environment, or a robot based on acquired information; a work plan generation unit that determines, regarding work executed by the user and the robot in cooperation, for each of steps of the work, whether to have the user or the robot execute the step, based on the context, and generates a work plan of the work; and a step determination unit that determines the steps to be executed by the user and the steps to be executed by the robot, based on the work plan.

An image processing method according to one aspect of the present disclosure comprises, by using an arithmetic processing device: analyzing at least one or more contexts of a user, an environment, or a robot based on acquired information; determining, regarding work executed by the user and the robot in cooperation, for each of steps of the work, whether to have the user or the robot execute the step, based on the context, and generating a work plan of the work; and determining the steps to be executed by the user and the steps to be executed by the robot, based on the work plan.

A computer program according to one aspect of the present disclosure causes a computer to function as: a context analysis unit that analyzes at least one or more contexts of a user, an environment, or a robot based on acquired information; a work plan generation unit that determines, regarding work executed by the user and the robot in cooperation, for each of steps of the work, whether to have the user or the robot execute the step, based on the context, and generates a work plan of the work; and a step determination unit that determines the steps to be executed by the user and the steps to be executed by the robot, based on the work plan.

According to the present disclosure, it is possible to analyze the context of the user, the environment, or the robot based on the information regarding the user, the environment, or the robot, and to determine each of the steps executed by the user and the robot, respectively, according to the analyzed context.

BRIEF DESCRIPTION OF DRAWINGS

FIG. 3 is an explanatory chart illustrating examples of contexts analyzed by a context analysis unit.

FIG. 4 is an explanatory chart illustrating examples of work plans for the work for making a Japanese rolled omelet.

FIG. 5 is a flowchart illustrating a flow of operation of the information processing apparatus according to the embodiment.

DESCRIPTION OF EMBODIMENT

A preferred embodiment of the present disclosure will be described in detail hereinafter with reference to the accompanying drawings. Note that same reference signs are applied to structural elements having substantially the same functional configurations to avoid duplicated explanations in the current Description and Drawings.

Note that explanations will be given in the following order.
1. Outline
2. Configuration Example
3. Operation Example
4. Hardware Configuration Example <1. Outline>

Figure 1:
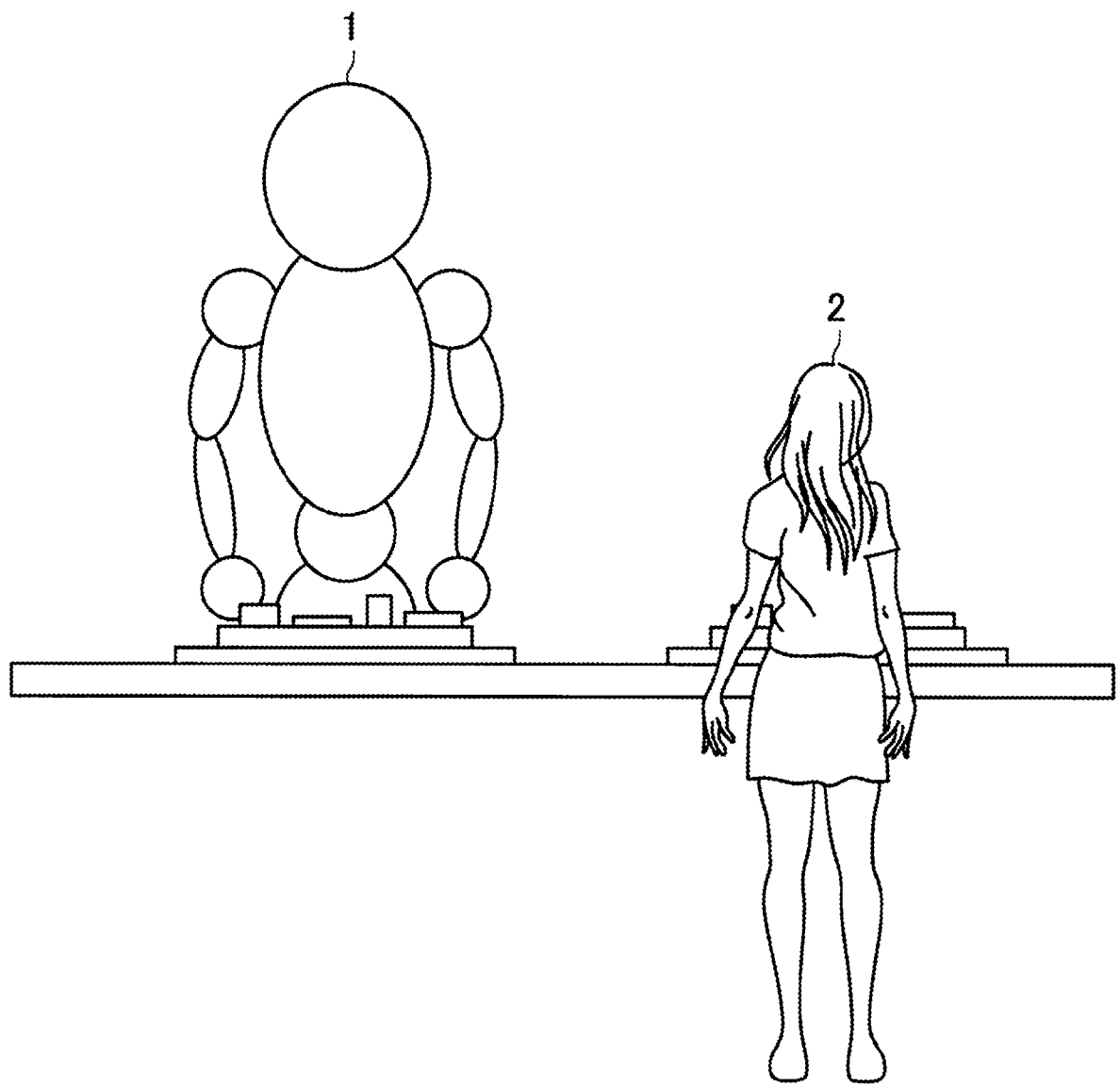
FIG. 1 is an explanatory diagram for describing work to which an information processing apparatus according to an embodiment of the present disclosure is applied.

First, outline of the information processing apparatus according to an embodiment of the present disclosure will be described by referring to FIG. 1. FIG. 1 is an explanatory diagram for describing work to which the information processing apparatus according to the embodiment is applied.

As illustrated in FIG. 1, the information processing apparatus according to the embodiment is applied to the work that is executed by a robot 1 and a user 2 in cooperation. The information processing apparatus according to the embodiment supports the robot 1 and the user 2 to work in cooperation by dividing the work into a plurality of steps and determining, for each of the divided steps, whether to have the robot 1 or the user 2 execute the step.

Note here that it is typical for the robot 1 used in public facilities, living spaces, or the like to execute the work in cooperation with various users 2 under various environments. In such cases, it is important to appropriately distribute each of the steps of the work to the steps executed by the robot 1 and the steps executed by the user 2 by considering the state of the robot 1, the user 2, the environment, and the like.

For example, in a case where the work executed by the robot 1 and the user 2 in cooperation is housework (for example, cooking work) or the like in a living space, whether to have the robot 1 or the user 2 execute each of the steps of the work may be affected by feeling, preference, interest, physical condition, habit, schedule, or the like of the user 2. It is because the work such as housework is closely related to the everyday life of the user 2, so that the preference and condition of the user 2 are strongly reflected upon the way of executing each of the steps of the work and the quality of the product.

More specifically, when the work executed by the robot 1 and the user 2 in cooperation is cooking, the user 2 may desire or not desire to execute, by the user oneself, the step using water or fire out of the cooking depending on the physical condition or the schedule of the user 2, the temperature, or the like. Alternatively, as for the cooking, the step using water or powders that may tend to cause breakdown of the robot 1 may be executable or unexecutable by the robot 1 depending on the maintenance state or the like of the robot 1.

Therefore, for the work executed by the robot 1 and the user 2 in cooperation, it is important to determine an entity (that is, the robot 1 or the user 2) for executing each of the steps of the work by considering the state of the user 2, the environment, or the robot 1.

The information processing apparatus according to the embodiment is designed in view of the aforementioned circumstances. The information processing apparatus according to the embodiment analyzes at least one state (also referred to as context) or more of the user 2, the environment, or the robot 1 in regards to the work executed by the robot 1 and the user 2 in cooperation, and determines, for each of the steps of the work, whether to have the robot 1 or the user 2 execute the step, based on the analyzed contexts.

With the information processing apparatus according to the embodiment, it is possible to have the user 2 execute appropriate steps among the steps of the work depending on the state of the user 2, the environment, or the robot 1. Thereby, the user 2 can execute the work in cooperation with the robot 1 more smoothly.

While it is described above that the work is executed by the robot 1 and the user 2 in cooperation, that does not necessarily mean that the robot 1 and the user 2 need to execute at least one of the steps of the work. For example, each of the steps of the work may all be executed by the robot 1 or may all be executed by the user 2. That is, the information processing apparatus according to the embodiment may determine that the robot 1 executes all steps of the work or may determine that the user 2 executes all steps of the work.

2. Configuration Example

Figure 2:
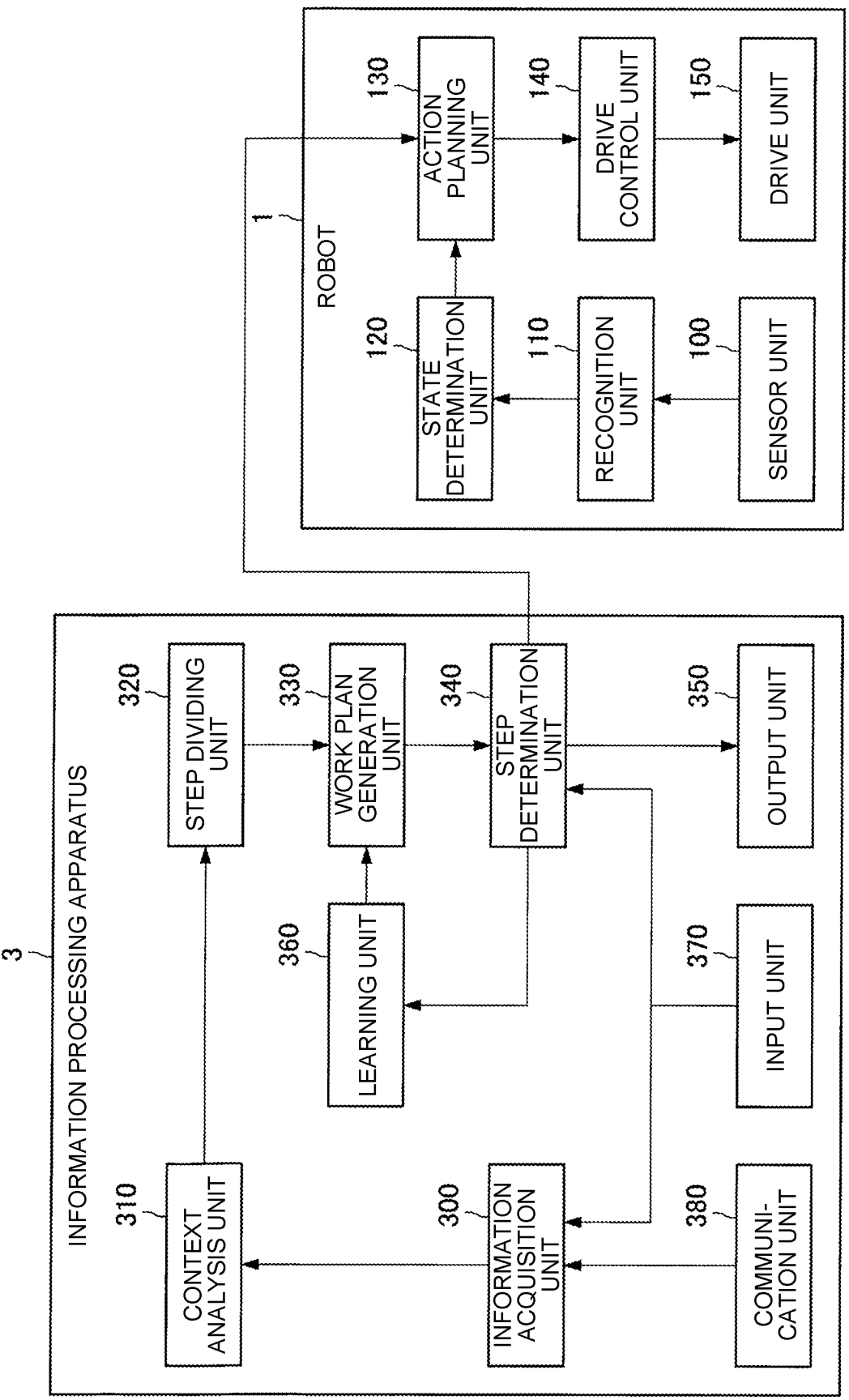
FIG. 2 is a block diagram illustrating internal configurations of the information processing apparatus according to the embodiment and of a robot that executes steps determined by the information processing apparatus.

Next, a specific configuration example of the information processing apparatus according to the embodiment will be described by referring to FIG. 2. FIG. 2 is a block diagram illustrating internal configurations of an information processing apparatus 3 according to the embodiment and of the robot 1 executing the steps determined by the information processing apparatus 3.

Information Processing Apparatus 3

As illustrated in FIG. 2, the information processing apparatus 3 includes a communication unit 380, an input unit 370, an information acquisition unit 300, a context analysis unit 310, a step dividing unit 320, a work plan generation unit 330, a step determination unit 340, a learning unit 360, and an output unit 350, for example.

The communication unit 380 is a communication interface including a communication device for performing transmission and reception of information via a network. The communication unit 380 may be a wired or wireless LAN (Local Area Network) compatible communication device or may be a cable communication device that performs cable communication via a wire. Furthermore, the network may be a public communication network such as the Internet, a satellite communication network, or a telephone line network or may be a communication network provided within a limited area, such as LAN.

The input unit 370 is an input interface including an input device that receives input of information from the user 2. The input unit 370 may include an input device with which the information is input, such as a touch panel, a keyboard, a mouse, a button, a microphone, a switch, or a lever, for example, and an input control circuit for generating input signals based on the input information.

The information acquisition unit 300 acquires information for the context analysis unit 310 to analyze at least one or more contexts of the user, the environment, or the robot via the input unit 370 or the communication unit 380.

For example, the information acquisition unit 300 may acquire the information regarding the feeling, preference, interest, physical condition, habit, or schedule of the user 2 via the input unit 370 or the communication unit 380. Such information regarding the user 2 can be acquired from a calendar application to which the schedule of the user 2 is registered, SNS (Social Networking Service) to which the user 2 is registered, or a wearable device the user 2 is wearing, for example. Furthermore, such information regarding the user 2 may also be directly input by the user 2.

For example, the information acquisition unit 300 may acquire the information regarding environments such as the time, climate such as the weather, the season, or the day of the week via the input unit 370 or the communication unit 380. The information regarding such environments can be acquired from the calendar application, a weather forecast application, or a news application, for example.

For example, the information acquisition unit 300 may acquire the information regarding specifications, use state, update state, or maintenance state of the robot 1 via the input unit 370 or the communication unit 380. Such information regarding the robot 1 can be acquired from management software or the like of the robot 1, for example.

Furthermore, the information acquisition unit 300 acquires information necessary for executing the work. Specifically, the information acquisition unit 300 may acquire the information regarding the content or procedure of the work and the information regarding tools for performing the work. For example, in a case where the work executed by the robot 1 and the user 2 in cooperation is cooking work, the information acquisition unit 300 may acquire information regarding the content or the procedure of cooking (that is, a cooking recipe) and information regarding whereabouts of cooking utensils such as knives or tableware such as plates.

The context analysis unit 310 analyzes at least one or more contexts of the user 2, the environment, or the robot 1 based on the information acquired by the information acquisition unit 300. The context of the user 2 indicates the state of the user 2. For example, the context of the user 2 may indicate the state of the user 2 based on the feeling, preference, physical condition, habit, or schedule of the user 2. Furthermore, the context of the environment may indicate the state of the environment based on the time, the climate such as the weather, the season, the day of the week, and the like. Moreover, the context of the robot 1 may indicate the state of the robot 1 based on the specifications, use state, update state, or maintenance state of the robot 1.

The context analysis unit 310 can analyze at least one or more contexts of the user 2, the environment, or the robot 1 by combining the information acquired by the information acquisition unit 300. The context analyzed by the context analysis unit 310 is used in a later stage for determining, for each of the steps of the work, whether to have the robot 1 or the user 2 execute the step.

Note that the context analysis unit 310 may analyze the context of at least the user 2 based on the information acquired by the information acquisition unit 300. It is because the context of the user 2 has a larger influence for assigning the steps to the robot 1 or to the user 2 compared to the contexts of the others. Therefore, when the context of the user 2 is analyzed, the information processing apparatus 3 is capable of determining each of the steps to be executed by the robot 1 or the user 2 more efficiently.

For example, the context analysis unit 310 may analyze the contexts from various kinds of information as in FIG. 3. FIG. 3 is an explanatory chart illustrating examples of the contexts analyzed by the context analysis unit 310.

As illustrated in FIG. 3, for example, the context analysis unit 310 may analyze the context regarding environmental periodicity based on the information regarding the season, the day of the week, the time, and the weather. Furthermore, the context analysis unit 310 may analyze the context regarding the events of the user 2 based on the schedule of the user 2 such as "had party yesterday", "leave for work early today", or "have guest today" or the feeling of the user 2 such as "get new knife" or "buy new plate". Furthermore, the context analysis unit 310 may analyze the context regarding the state of the user 2 based on the information regarding the body of the user 2 such as the physical condition or fatigue state of the user 2, or "have injured finger". Furthermore, the context analysis unit 310 may analyze the context regarding the state of the robot 1 based on the information regarding the update state of the robot 1 such as "end effector is exchanged" or the maintenance state of the robot 1 such as "arm is repaired".

The step dividing unit 320 divides the work into a plurality of steps. Specifically, the step dividing unit 320 may divide the work into a plurality of steps based on the information regarding the content or the procedure of the work acquired by the information acquisition unit 300, the information regarding the tools for performing the work, and the context analyzed by the context analysis unit 310. For example, when the work executed by the robot 1 and the user 2 in cooperation is cooking work, the step dividing unit 320 may divide the work into a plurality of steps based on the cooking recipe and the steps that can be executed by the robot 1 or the user 2.

The work plan generation unit 330 generates a work plan of the work by determining, for each of the steps of the work divided by the step dividing unit 320, whether to have the robot 1 or the user 2 execute the step. Specifically, first, the work plan generation unit 330 determines, for each of the divided steps of the work, whether to have the robot 1 or the user 2 execute the step, based on the context analyzed by the context analysis unit 310. Subsequently, the work plan generation unit 330 generates, based on the determination, a work plan in which each of the steps of the work is assigned to the robot 1 or to the user 2, respectively.

For example, in a case where the robot 1 executes all steps of the work, it may take more time compared to a case where the robot 1 and the user 2 execute the work in cooperation since the end effector of the robot 1 may need to be exchanged depending on each of the steps or the robot 1 may execute the steps the robot 1 is not good at. In the meantime, in a case where the user 2 has plenty of time, in a case where the user 2 is tired, or in a case where the user 2 is in a physically poor condition, the user 2 may desire to have the robot 1 execute many steps even if it takes time. Inversely, in a case where the user 2 does not have enough time, in a case where the user 2 wants to try a new utensil, or in a case where the user 2 particularly cares about the quantity of the product, the user 2 may desire to execute more steps by the user 2 oneself.

The work plan generation unit 330 can generate a work plan upon which the desire of the user 2 described above is reflected by determining, for each of the steps of the work, whether to have the robot 1 or the user 2 execute the step, based on the context analyzed by the context analysis unit 310.

The generated work plan is presented to the user 2 via the output unit 350. The user 2 can execute the work in cooperation with the robot 1 according to the work plan in which each of the steps of the work is assigned as desired by selecting the desired work plan from a plurality of presented work plans or by changing the presented work plans.

Furthermore, the work plan generation unit 330 may present each work plan along with additional information that may be useful for the user 2 to select the work plans. Specifically, the work plan generation unit 330 may present each work plan along with the information regarding the time required for the entire work. Furthermore, the work plan generation unit 330 may present each work plan along with the information regarding the fatigue level felt by the user 2 due to the work.

Moreover, the work plan generation unit 330 may present each work plan along with the information regarding the influence on the product acquired by the work. The user 2 can select the work plan that is more suited for the user's desire from the work plans by referring to such information.

For example, in a case where the work executed by the robot 1 and the user 2 in cooperation is cooking work, the work plan generation unit 330 may estimate the time required for the entire cooking and present the estimated time required for the cooking for each work plan. Furthermore, the work plan generation unit 330 may estimate the load imposed upon the user 2 with the entire cooking and present the estimated fatigue level of the user 2 caused by the cooking for each work plan. Moreover, the work plan generation unit 330 may present, for each work plan, to what extent the user 2 can demonstrate the user's commitment to the taste and the way of serving the dish made by the cooking. Furthermore, the work plan generation unit 330 may present the level of impression that can be experienced by the user 2 with the entire cooking for each work plan.

Examples of work plans of the work are illustrated in FIG. 4. FIG. 4 is an explanatory chart illustrating examples of work plans for the work when making a Japanese rolled omelet.

In the work plans illustrated in FIG. 4, the work for making a Japanese rolled omelet is divided into eleven steps by the step dividing unit 320. Specifically, the work for making a Japanese rolled omelet is divided into elven steps of "1. Prepare ingredients", "2. Prepare utensils", "3. Crack eggs into bowl", "4, Sprinkle salt on eggs", "5. Stir eggs with chopsticks", "6. Heat frying pan and put oil", "7. Pour stirred eggs into frying pan", "8. Roll eggs", "9. Take out rolled omelet and place it on cutting board", "10. Cut omelet on cutting board with knife", and "11. Place cut omelet on plate".

As illustrated in FIG. 4, the work plan generation unit 330 generates "work plan 1" in which all steps 1 to 11 are executed by the robot 1, "work plan 2" in which steps 1 to 3 and 11 are executed by the user 2, and steps 4 to 10 are executed by the robot 1, and "work plan 3" in which steps 4, 10, and 11 are executed by the user 2, and steps 1 to 3 and 5 to 9 are executed by the robot 1, and presents those to the user 2. Furthermore, the work plan generation unit 330 quantifies the estimated cooking time, fatigue level of the user 2, level of commitment to the taste, level of commitment to the way of serving, and level of a new experience perceived for each of "work plan 1", "work plan 2", and "work plan 3", and also presents those to the user 2.

The user 2 referring to the work plans as in FIG. 4 can select the work plan suited for the own desire from "work plan 1" to "work plan 3". Furthermore, the user 2 may change a part of one of the presented work plans via the input unit 370, and select the changed work plan.

The step determination unit 340 determines the steps to be executed by the robot 1 and the steps to be executed by the user 2, based on the work plan generated by the work plan generation unit 330. Furthermore, the step determination unit 340 instructs the robot 1 and the user 2 to execute each of the steps of the work determined therefor.

Specifically, the step determination unit 340 determines the steps to be executed by the robot 1 and the steps to be executed by the user 2, based on the work plan selected by the user 2 from the work plans generated by the work plan generation unit 330 or the work plan that is changed by the user 2 from the work plan generated by the work plan generation unit 330. Thereafter, the step determination unit 340 indicates the steps to be executed by the robot 1 to an action planning unit 130 of the robot 1, and indicates the steps to be executed by the user 2 to the user 2 via the output unit 350.

The learning unit 360 performs machine learning by using assignment of each of the steps of the work for the robot 1 and the user 2 determined by the step determination unit 340 so as to optimize generation of the work plans by the work plan generation unit 330.

Specifically, the learning unit 360 may perform machine learning by using assignment of each of the steps of the work for the robot 1 and the user 2 determined by the step determination unit 340 and the context of the work so as to optimize generation of the work plans by the work plan generation unit 330. The learning unit 360 can support the work plan generation unit 330 to generate the work plan more optimized for the user 2 by learning the personality, habits, or the like of the user 2.

The machine learning by the learning unit 360 can be performed by using known machine algorithms. The machine learning by the learning unit 360 can be performed by using algorithms such as state transition model, neural network, deep learning, hidden Markov model, k-nearest neighbor algorithm, Kernel method, and support vector machine, for example.

The output unit 350 is an output interface including a display device or an audio output device for presenting the information to the user 2. Specifically, the output unit 350 may present the work plans generated by the work plan generation unit 330 to the user 2.

Furthermore, the output unit 350 may encourage the user 2 to execute the steps by presenting the steps to be executed by the user 2 among the divided steps of the work. The output unit 350 may be configured with a display device such as a CRT (Cathode Ray Tube) display device, a liquid crystal display device, or an organic EL (Organic Electroluminescence) display device or an audio output device such as a speaker or a headphone, for example.

Robot 1

The robot 1 executes the steps determined by the step determination unit 340 to be executed by the robot 1 by being driven based on the information transmitted from the information processing apparatus 3. While the robot 1 may be in any configurations as long as it is capable of executing each of the steps of the work, the robot 1 may have the configuration illustrated in FIG. 2, for example.

As illustrated in FIG. 2, the robot 1 may include a sensor unit 100, a recognition unit 110, a state determination unit 120, the action planning unit 130, a drive control unit 140, and a drive unit 150, for example.

The sensor unit 100 includes various kinds of sensors, measures the external environment or the state of the robot 1, and outputs the measured data. For example, the sensor unit 100 may include various kinds of cameras such as an RGB camera, a gray scale camera, a stereo camera, a depth camera, an infrared camera, or a ToF (Time of Flight) camera as a sensor for measuring the state of the external environment. Furthermore, the sensor unit 100 may include various kinds of ranging sensors such as a LIDAR (Laser Imaging Detection and Ranging) sensor or a RADAR (Radio Detecting and Ranging) sensor. Moreover, the sensor unit 100 may include an encoder, a voltmeter, an ammeter, a strain gauge, a pressure gauge, an IMU (Inertial Measurement Unit), a thermometer, or a hygrometer, for example, as a sensor for measuring the state of the robot 1. Note, however, that the sensor unit 100 may naturally include any known sensor other than those described above as long as it is a sensor that measures the external environment or the state of the robot 1.

The recognition unit 110 recognizes the external environment and the state of the robot 1 based on the data measured by the sensor unit 100. Specifically, the recognition unit 110 may recognize the external environment by obstacle recognition, shape recognition (that is, wall recognition or floor recognition), object recognition, marker recognition, character recognition, white-line or lane recognition, or voice recognition based on the data input from the sensor unit 100. The recognition unit 110 may recognize the state of the robot 1 by performing position recognition, motion-state (speed, acceleration, jerk, or the like) recognition, or device-state (remaining power, temperature, joint angle, or the like) recognition. Aforementioned recognition performed by the recognition unit 110 can be performed by using known recognition techniques. Recognition by the recognition unit 110 may be performed based on a prescribed rule or may be performed based on a machine learning algorithm, for example.

The state determination unit 120 determines the state of the external environment based on the recognition result of the external environment acquired by the recognition unit 110. Specifically, the state determination unit 120 may generate an action planning map in which information necessary for generating an action plan of the robot 1 is embedded by determining the state of the external environment based on the recognition result of the external environment acquired by the recognition unit 110. Note that the action planning map is a map in which meanings for the robot 1 are embedded to each of areas and objects included in a map of the external environment.

The action planning unit 130 generates an action plan of the robot 1 based on the state determined by the state determination unit 120. Specifically, the action planning unit 130 may generate the action plan of the robot 1 based on the action planning map generated by the state determination unit 120 and the device information of the robot 1. Note that the device information of the robot 1 is the information regarding the specifications of the robot 1 and the information regarding the state of the robot 1 recognized by the recognition unit 110. Thereby, the action planning unit 130 can generate the action plan for the robot 1 to execute each of the steps of the work.

The drive control unit 140 outputs a control instruction for driving the drive unit 150 such that desired actions are taken based on the action plan generated by the action planning unit 130 and the device information of the robot 1. Specifically, the drive control unit 140 calculates an error between the state planed in the action plan and the current state of the robot 1 so as to output a control instruction to reduce the calculated error to the drive unit 150.

The drive unit 150 drives each part (an arm, a leg, or the like) of the robot 1 according to the control instruction or the like from the drive control unit 140. For example, the drive unit 150 is a module for making output to an actual space, which may be an engine, a motor, a speaker, a projector, a display, or a light emitter (for example, a light bulb, an LED, a laser, or the like). The drive unit 150 is capable of making the robot 1 execute the indicated steps of the work by driving each part (an arm, a leg, or the like) of the robot 1.

With the information processing apparatus 3 including the above-described configuration, it is possible to determine, for each of the steps of the work, whether to have the robot 1 or the user 2 execute the step, based on the desire of the user 2 inferred from the context. Therefore, the information processing apparatus 3 is capable of allowing the user 2 to execute more appropriate steps among each of the steps of the work in regards to the work that is executed by the robot 1 and the user 2 in cooperation.

3. Action Example

Subsequently, by referring to FIG. 5, a flow of the operation of the information processing apparatus 3 according to the embodiment will be described in a specific manner. FIG. 5 is a flowchart illustrating a flow of the operation of the information processing apparatus 3 according to the embodiment. FIG. 5 illustrates a case where the work executed by the robot 1 and the user 2 in cooperation is cooking work in order to describe the operation of the information processing apparatus 3.

As illustrated in FIG. 5, first, the information processing apparatus 3 confirms whether the user 2 has determined a menu to be cooked (S101). When the menu to be cooked is not being determined (No at S101), the information processing apparatus 3 presents a menu selection screen for selecting the menu to be cooked to the user 2 via the output unit 350 for allowing the user 2 to select a menu to be cooked from the menu selection screen (S103). When the menu to be cooked is determined (Yes at S101), step S103 is skipped.

Subsequently, the information processing apparatus 3 confirms whether the user 2 entrusts the way of determination, that is, determining, for each of the steps of the cooking work, whether to have the robot 1 or the user 2 execute the step, to the information processing apparatus 3 (S105). When the way of determination is not entrusted to the information processing apparatus 3 (No at S105), the information processing apparatus 3 receives any desired input from the user 2 (S107). When the way of determination is entrusted to the information processing apparatus 3 (Yes at S105), step S107 is skipped.

Next, the information acquisition unit 300 acquires information regarding the user 2, the environment, and the robot 1, via the communication unit 380 or the input unit 370 (S109). Subsequently, the context analysis unit 310 analyzes at least one or more contexts of the user 2, the environment, or the robot 1 based on the acquired information (S111).

Thereafter, the step dividing unit 320 divides the cooking work into a plurality of steps (S113). At this time, the step dividing unit 320 may divide the divided step further into a plurality of sub-steps depending on the case. Then, the work plan generation unit 330 determines, for each of the steps, whether to have the robot 1 or the user 2 execute the step, based on the context, the work time, and the desire or the like input in step S107, and generates a plurality of work plans based on the determination (S115). Subsequently, the generated work plans are presented to the user 2 via the output unit 350 (S117).

After being selected or changed by the user 2 (S119) from the presented work plans, the work plan is settled. The step determination unit 340 confirms whether the user 2 has settled the work plan (S121) and, when the work plan has not been settled by the user 2 (No at S121), stands by until the work plan is settled by the user 2 (returns to before S119). When the work plan is settled by the user 2 (Yes at S121), the step determination unit 340 determines, for each of the steps of the settled work plan, whether to have the robot 1 or the user 2 execute the step. Thereafter, the step determination unit 340 instructs the robot 1 and the user 2 to execute each of the steps of the work, correspondingly, as determined (S123).

According to the flow described above, the information processing apparatus 3 is capable of appropriately determining, regarding work executed by the robot 1 and the user 2 in cooperation, for each of the steps of the work, whether to have the robot 1 or the user 2 execute the step.

4. Hardware Configuration Example

Figure 6:
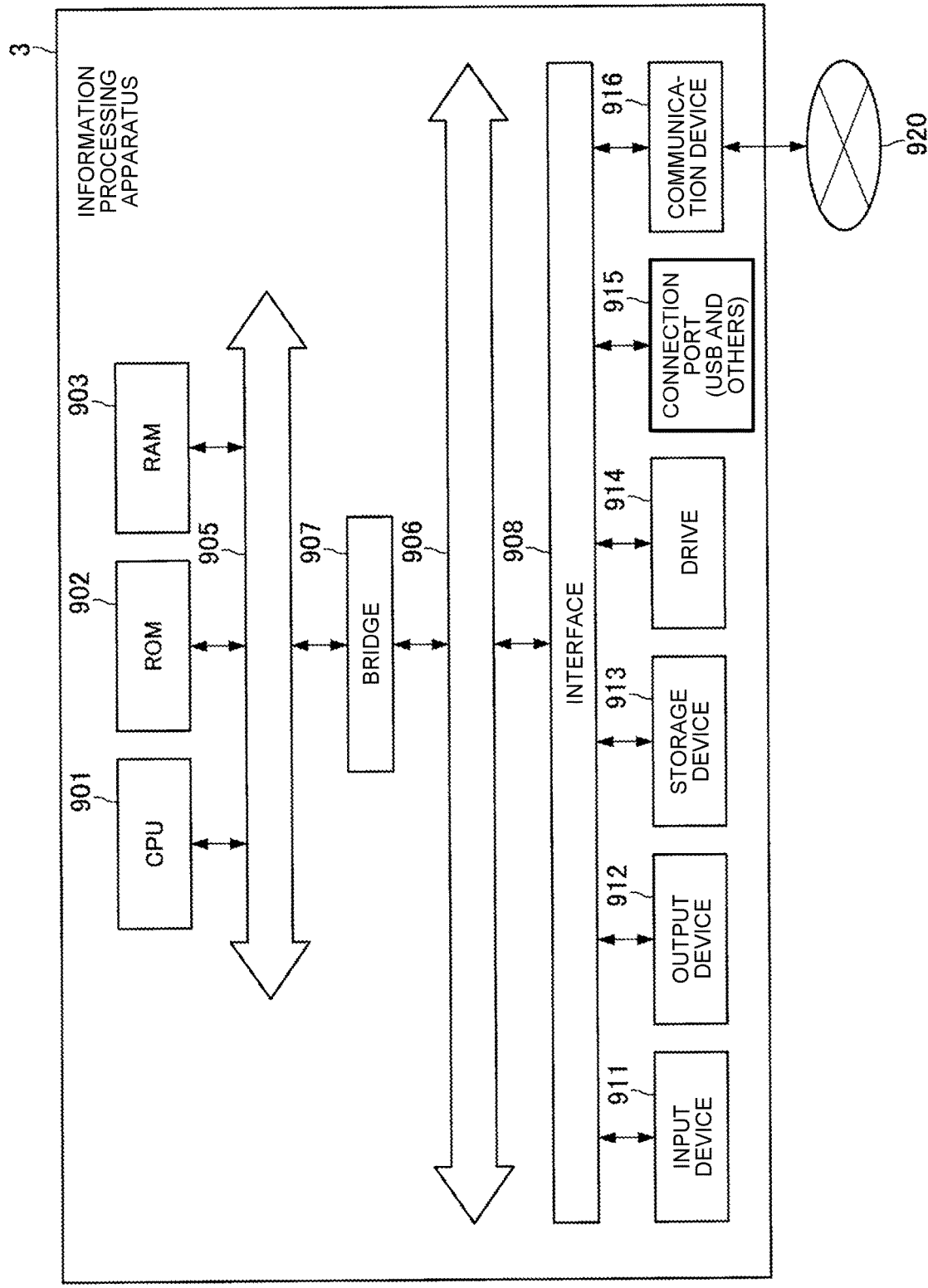
FIG. 6 is a block diagram illustrating an example of a hardware configuration of the information processing apparatus according to the embodiment.

Furthermore, a hardware configuration of the information processing apparatus 3 according to the embodiment will be described by referring to FIG. 6. FIG. 6 is a block diagram illustrating the hardware configuration of the information processing apparatus 3 according to the embodiment.

As illustrated in FIG. 6, the information processing apparatus 3 includes a CPU (Central Processing Unit) 901, a ROM (Read Only Memory) 902, a RAM (Random Access Memory) 903, a bridge 907, internal buses 905, 906, an interface 908, an input device 911, an output device 912, a storage device 913, a drive 914, a connection port 915, and a communication device 916.

The CPU 901 functions as an arithmetic processing device, and controls entire actions of the information processing apparatus 3 according to various computer programs stored in the ROM 902 and the like. The ROM 902 stores therein computer programs and arithmetic parameters used by the CPU 901, and the RAM 903 temporarily stores therein the computer program used in execution of the CPU 901 and the parameter and the like that change as appropriate in the execution. For example, the CPU 901 may execute functions of the information acquisition unit 300, the context analysis unit 310, the step dividing unit 320, the work plan generation unit 330, and the step determination unit 340.

The CPU 901, the ROM 902, and the RAM 903 are mutually connected via the bridge 907, the internal buses 905, 906, and the like. Furthermore, the CPU 901, the ROM 902, and the RAM 903 are also connected to the input device 911, the output device 912, the storage device 913, the drive 914, the connection port 915, and the communication device 916 via the interface 908.

The input device 911 includes an input device with which information is input, such as a touch panel, a keyboard, a mouse, a button, a microphone, a switch, or a lever. Furthermore, the input device 911 includes an input control circuit and the like for generating input signals based on the input information and outputting those to the CPU 901. The input device 911 may execute the function of the input unit 370.

The output device 912 includes a display device such as a CRT (Cathode Ray Tube) display device, a liquid crystal display device, or an organic EL (Organic Electroluminescence) display device, for example. Furthermore, the output device 912 may include an audio output device such as a speaker or a headphone. The output device 912 may execute the function of the output unit 350.

The storage device 913 is a storage device for storing therein data of the information processing apparatus 3. The storage device 913 may include a storage medium, a storage device that stores therein data to the storage medium, a reader device that reads out the data from the storage medium, and an eraser device that erases the stored data.

The drive 914 is a reader/writer for the storage medium, and it is built-in or externally attached to the information processing apparatus 3. For example, the drive 914 reads out the information stored in a removable storage medium, such as a magnetic disk, an optical disk, a magneto-optical disk, or a semiconductor memory, each of which mounted to the drive 914, and outputs the read out information to the RAM 903. The drive 914 is also capable of writing the information to the removable storage medium.

The connection port 915 is a connection interface configured with a connection port for connecting external connection device, such as a USB (Universal Serial Bus) port, an Ethernet (registered trademark) port, a port of IEEE802.11 standards, or an optical audio terminal, for example.

The communication device 916 is a communication interface configured with a communication device or the like for connecting to a network 920, for example. Furthermore, the communication device 916 may be a wired or wireless LAN compatible communication device or may be a cable communication device that performs cable communication via a wire. The communication device 916 may execute the function of the communication unit 380, for example.

Note that it is also possible to generate a computer program for causing the hardware such as the CPU, the ROM, and the RAM built in the information processing apparatus 3 to implement the same functions as those of the structures of the information processing apparatus 3 according to the embodiment described above. Furthermore, it is also possible to provide a storage medium to which the computer program is stored.

While the preferred embodiment of the present disclosure has been described in detail by referring to the accompanying drawings, the technical scope of the present disclosure is not limited thereto. It is clear that various changes and modifications are easily conceived by those having ordinary skill in the art to which the present disclosure pertains within the scope of the technical idea described in the scope of the appended claims, and it is to be understood that such changes and modifications are to be included in the technical scope of the present disclosure.

Furthermore, the effects disrobed in the Description are only descriptive or illustrative and not restrictive. That is, the technique according to the present disclosure can achieve other effects that are obvious to those skilled in the art from the current Description along with the above-described effects or instead of the above-described effects.

Note that following configurations are included in the technical scope of the present disclosure.

(1) An information processing apparatus comprising:
a context analysis unit that analyzes at least one or more contexts of a user, an environment, or a robot based on acquired information;
a work plan generation unit that determines, regarding work executed by the user and the robot in cooperation, for each of steps of the work, whether to have the user or the robot execute the step, based on the context, and generates a work plan of the work; and
a step determination unit that determines the steps to be executed by the user and the steps to be executed by the robot, based on the work plan.

(2) The information processing apparatus according to (1), wherein the step determination unit determines, for each of the steps, whether to have the user or the robot execute the step, based on a work plan that is changed by the user from the generated work plan.

(3) The information processing apparatus according to (1) or (2), wherein
the work plan generation unit generates a plurality of work plans of the work, and the work plan generation unit determines the steps to be executed by the user and the steps to be executed by the robot, based on a work plan selected by the user among the generated work plans.

(4) The information processing apparatus according to (3), wherein the work plan generation unit presents information related to time required for the work for each of the generated work plans.

(5) The information processing apparatus according to (3) or (4), wherein the work plan generation unit presents information related to an influence of the work imposed on a product for each of the generated work plans.

(6) The information processing apparatus according to any one of (1) to (5), further comprising a learning unit that optimizes generation of the work plan to be executed by the work plan generation unit by performing machine learning using each of the steps determined by the step determination unit and executed by the user and the robot.

(7) The information processing apparatus according to any one of (1) to (6), further comprising a step dividing unit that divides the work into a plurality of steps based at least on the context.

(8) The information processing apparatus according to any one of (1) to (7), wherein the context analysis unit analyzes the context of at least the user.

(9) The information processing apparatus according to any one of (1) to (8), wherein the context of the user includes at least one or more contexts selected from feeling, curiosity, physical condition, habit, and schedule of the user.

(10) The information processing apparatus according to any one of (1) to (9), wherein the context of the robot includes at least one or more contexts selected from specifications, use state, update state, and maintenance state of the robot.

(11) The information processing apparatus according to any one of (1) to (10), wherein the context of the environment includes at least one or more contexts selected from time, weather, season, and day of the week.

(12) The information processing apparatus according to any one of (1) to (11), wherein the work is cooking work.

(13) An image processing method comprising, by using an arithmetic processing device:

analyzing at least one or more contexts of a user, an environment, or a robot based on acquired information;

determining, regarding work executed by the user and the robot in cooperation, for each of steps of the work, whether to have the user or the robot execute the step, based on the context, and generating a work plan of the work; and determining the steps to be executed by the user and the steps to be executed by the robot, based on the work plan.

(14) A computer program causing a computer to function as:

a context analysis unit that analyzes at least one or more contexts of a user, an environment, or a robot based on acquired information;

a work plan generation unit that determines, regarding work executed by the user and the robot in cooperation, for each of steps of the work, whether to have the user or the robot execute the step, based on the context, and generates a work plan of the work; and a step determination unit that determines the steps to be executed by the user and the steps to be executed by the robot, based on the work plan.

REFERENCE SIGNS LIST

1 Robot
2 User
3 Information processing apparatus
100 Sensor unit
110 Recognition unit
120 State determination unit
130 Action planning unit
140 Drive control unit
150 Drive unit
300 Information acquisition unit
310 Context analysis unit
320 Step dividing unit
330 Work plan generation unit
340 Step determination unit
350 Output unit
360 Learning unit
370 Input unit
380 Communication unit

The invention claimed is:

1. An information processing apparatus comprising:

a context analysis unit configured to analyze one or more contexts selected from a context of a user, a context of an environment, or a context of a robot based on acquired information;

a work plan generation unit configured to
determine, regarding each step of a plurality of steps of work to be executed by the user and the robot in cooperation, whether to have the user or the robot execute the step, based on the at least one context, and
generate a work plan of the work;

a step determination unit configured to determine steps to be executed by the user and steps to be executed by the robot among the plurality of steps, based on the generated work plan, and an output unit configured to control output of the generated work plan including the determined steps to be executed by the user and the determined steps to be executed by the robot, wherein the output of the generated work plan includes transmission of instructions configured to control at least one drive unit of the robot to execute the determined steps to be executed by the robot, and wherein the context analysis unit, the work plan generation unit, the step determination unit, and the output unit are each implemented via at least one processor.

2. The information processing apparatus according to claim 1, wherein the step determination unit determines, for each respective step of the plurality of steps, whether to have the user or the robot execute the respective step, based on a changed work plan that is changed by the user from the generated work plan output by the output control unit.

3. The information processing apparatus according to claim 1, wherein
the work plan generation unit generates a plurality of work plans of the work, and
the work plan generation unit determines the steps to be executed by the user and the steps to be executed by the robot, based on a selected work plan selected by the user from among the plurality of generated work plans.

4. The information processing apparatus according to claim 3, wherein the output unit is further configured to output information related to time required for the work for each of the generated work plans.

5. The information processing apparatus according to claim 3, wherein the output unit is further configured to output information related to a quality of a product resulting from execution of each of the generated work plans.

6. The information processing apparatus according to claim 1, further comprising:

a learning unit configured to optimize generation of the work plan to be executed by the work plan generation unit by performing machine learning using each of the steps determined by the step determination unit and executed by the user and the robot, wherein the learning unit is implemented via at least one processor.

7. The information processing apparatus according to claim 1, further comprising:

a step dividing unit configured to divide the work into a plurality of steps based on the at least one context, wherein the step dividing unit is implemented via at least one processor.

8. The information processing apparatus according to claim 1, wherein the context analysis unit analyzes the context of the user with higher priority than analysis of the context of the environment or the context of the robot.

9. The information processing apparatus according to claim 1, wherein the context of the user includes one or more contexts selected from feeling, curiosity, physical condition, habit, or schedule of the user.

10. The information processing apparatus according to claim 1, wherein the context of the robot includes one or more contexts selected from specifications, use state, update state, or maintenance state of the robot.

11. The information processing apparatus according to claim 1, wherein the context of the environment includes one or more contexts selected from time, weather, season, or day of week.

12. The information processing apparatus according to claim 1, wherein the work includes cooking work.

13. An image processing method comprising, by using an arithmetic processing device:

analyzing one or more contexts selected from a context of a user, a context of an environment, or a context of a robot based on acquired information;

determining, regarding each step of a plurality of steps of work to be executed by the user and the robot in cooperation, whether to have the user or the robot execute the step, based on the at least one context;

generating a work plan of the work;

determining steps to be executed by the user and steps to be executed by the robot among the plurality of steps, based on the generated work plan; and outputting the generated work plan including the determined steps to be executed by the user and the determined steps to be executed by the robot, wherein the output of the generated work plan includes transmission of instructions configured to control at least one drive unit of the robot to execute the determined steps to be executed by the robot.

14. A non-transitory computer-readable storage medium having embodied thereon a computer program, which when executed by a computer causes the computer to execute a method, the method comprising:

analyzing one or more contexts selected from a context of a user, a context of an environment, or a context of a robot based on acquired information;

determining, regarding each step of a plurality of steps of work to be executed by the user and the robot in cooperation, whether to have the user or the robot execute the step, based on the at least one context;

generating a work plan of the work;

determining steps to be executed by the user and steps to be executed by the robot among the plurality of steps, based on the generated work plan; and outputting the generated work plan including the determined steps to be executed by the user and the determined steps to be executed by the robot, wherein the output of the generated work plan includes transmission of instructions configured to control at least one drive unit of the robot to execute the determined steps to be executed by the robot.

* * * * *